(12) United States Patent
Jo et al.

(10) Patent No.: US 9,018,268 B2
(45) Date of Patent: Apr. 28, 2015

(54) EXPANDABLE STARCH BEADS AND METHOD FOR PREPARING THE SAME

(75) Inventors: Young Mo Jo, Icheon-si (KR); Ssang Ok Kim, Seoul (KR); Gun Kyu Lee, Icheon-si (KR); Jee Young Yoon, Seoul (KR); Young Seung Jeon, Seoul (KR)

(73) Assignee: Daesang Corporation, Seoul (KR)

( * ) Notice: Subject to any disclaimer, the term of this patent is extended or adjusted under 35 U.S.C. 154(b) by 340 days.

(21) Appl. No.: 13/809,973

(22) PCT Filed: Jul. 14, 2011

(86) PCT No.: PCT/KR2011/005205
§ 371 (c)(1),
(2), (4) Date: Jan. 14, 2013

(87) PCT Pub. No.: WO2012/008784
PCT Pub. Date: Jan. 19, 2012

(65) Prior Publication Data
US 2013/0116352 A1    May 9, 2013

(30) Foreign Application Priority Data
Jul. 15, 2010  (KR) .................. 10-2010-0068412

(51) Int. Cl.
| | | |
|---|---|---|
| C08J 9/16 | (2006.01) |
| C08J 9/18 | (2006.01) |
| C08J 9/20 | (2006.01) |
| C08J 9/12 | (2006.01) |
| C08J 9/232 | (2006.01) |
| C08L 3/02 | (2006.01) |

(52) U.S. Cl.
CPC .... C08J 9/12 (2013.01); C08J 9/18 (2013.01); C08J 9/232 (2013.01); C08J 2203/06 (2013.01); C08J 2203/14 (2013.01); C08J 2203/142 (2013.01); C08J 2351/02 (2013.01); C08J 2367/04 (2013.01); C08L 3/02 (2013.01)

(58) Field of Classification Search
USPC .......................................... 521/56
See application file for complete search history.

(56) References Cited

U.S. PATENT DOCUMENTS

| | | | |
|---|---|---|---|
| 4,863,655 A | | 9/1989 | Lacourse et al. |
| 6,130,266 A | * | 10/2000 | Mihayashi et al. ............. 521/58 |
| 6,506,807 B1 | * | 1/2003 | Yanagihara et al. ........... 521/56 |
| 2007/0021515 A1 | * | 1/2007 | Glenn et al. .................... 521/99 |
| 2009/0206507 A1 | | 8/2009 | Martin et al. |

FOREIGN PATENT DOCUMENTS

| | | |
|---|---|---|
| EP | 0409782 A2 | 1/1991 |
| JP | 356543 A | 3/1991 |
| JP | 200044715 A | 2/2000 |
| KR | 1020040076149 A | 8/2004 |
| KR | 1020080049790 A | 6/2008 |
| KR | 100858544 B1 | 9/2008 |

* cited by examiner

*Primary Examiner* — Kara Boyle
(74) *Attorney, Agent, or Firm* — The Webb Law Firm

(57) ABSTRACT

Provided is expandable starch beads including a starch-monomer copolymer and a foaming agent impregnated in the starch-monomer copolymer, in which the starch-monomer copolymer is prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch, and the foaming agent includes at least one selected from the group consisting of $C_2$ to $C_7$ aliphatic hydrocarbon, $C_2$ to $C_7$ halogenated hydrocarbon, and carbon dioxide. Since the expandable starch beads have the similar properties to expandable polystyrene beads, and thereby can be foam-molded by equipment for foaming the expandable polystyrene beads, it is possible to produce foams with various sizes and various shapes.

20 Claims, 7 Drawing Sheets

EXPANDABLE STARCH BEADS AND METHOD FOR PREPARING THE SAME

TECHNICAL FIELD

The present invention relates to expandable starch beads, and a method for preparing the same, and more particularly, to expandable starch beads including a starch-monomer copolymer formed by bonding a specific monomer to starch, and a volatile foaming agent impregnated in the starch-monomer copolymer, and a method for preparing the expandable starch beads.

BACKGROUND ART

Styrofoam prepared by foaming expandable polystyrene beads is often used as a raw material for a disposable product, but is being magnified as a main cause of environmental pollution because in the case of discharging it after using Styrofoam to natural environment, it is not discomposed, and thus semi-permanently left. Therefore, the researches on a biodegradable material for replacing Styrofoam are being actively carried out, but a material capable of totally replacing Styrofoam is as yet undeveloped.

Starch is often used as a main component for a biodegradable material capable of replacing Styrofoam, and U.S. Pat. No. 4,863,655 discloses a method for preparing a biodegradable buffer material, in which the method includes supplying starch or modified starch, and water as a foaming agent to an extruder and then foam-molding. However, in the case of foam-molding using an extruder, it is difficult to prepare foams having various shapes and sizes, and foam in a type of peanut is mainly prepared. In addition, in the case of foams prepared by using general starch as a main component, there are limitations on the replacement of Styrofoam as for physical properties, and the like. In addition, there is a case of preparing foams, in which starch is foamed by using an extruder, and then the foamed extrudate is subjected to a complex working process, such as a compression, junction, and cutting to give a type. However, equipment of foaming expandable polystyrene beads cannot be used, and also there are limitations on a use and economic feasibility due to a multi-step process. In addition, US Patent Publication No. 2007/0021515 discloses a method for preparing foams having a specific type, in which the method includes extruding a starch composition including starch, and a foaming agent such as water or alcohol by an extruder to prepare beads, and then foam-molding the prepared beads to give a specific type. However, there are problems such that a type of a usable foaming agent is limited because of properties of starch, so that special foaming equipment is required instead of equipment for foaming expandable polystyrene beads, which uses various molds and steam when preparing foams, and there are limitations on a rate of foaming, and the like.

Meanwhile, the researches on a production of foams or expandable beads using a biodegradable resin, such as polybutylene succinate and polylactic acid are constantly being carried out, and development cases are reported. However, it is expensive as compared with expandable polystyrene beads, and has a poor mechanical property as compared with Styrofoam, so that there are limitations on a use of it.

Technical Solution

The present invention is induced to solve the conventional problems, and an object of the present invention is to provide expandable starch beads prepared by using eco-friendly starch as a main component, in which like expandable polystyrene beads, the expandable starch beads can be molded into foams having a specific type in molds with various shapes.

In addition, another object of the present invention is to provide a method for preparing the expandable starch beads.

In order to obtain the object of the present invention, the present invention provides expandable starch beads including a starch-monomer copolymer, and a foaming agent impregnated in the starch-monomer copolymer, in which the starch-monomer copolymer is prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch, and the foaming agent includes at least one selected from the group consisting of $C_2$ to $C_7$ aliphatic hydrocarbon, $C_2$ to $C_7$ halogenated hydrocarbon, and carbon dioxide.

In addition, the present invention provides expandable starch beads including particulate pellets formed by extruding a mixture of a starch-monomer copolymer and a resin, and a foaming agent impregnated in the particulate pellets, in which the starch-monomer copolymer is prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch, the resin includes at least one selected from the group consisting of polystyrene, polyethylene, polypropylene, ethylenevinylacetate, polylactic acid, polycaprolactone, polybutylene succinate, polybutylene succinate adipate and polybutylene adipate terephthalate, and the foaming agent includes at least one selected from the group consisting of $C_2$ to $C_7$ aliphatic hydrocarbon, $C_2$ to $C_7$ halogenated hydrocarbon, and carbon dioxide.

In order to obtain other object of the present invention, the present invention provides a method for preparing expandable starch beads, in which the method includes preparing a starch-monomer copolymer; and impregnating a foaming agent in the starch-monomer copolymer thus prepared; and the starch-monomer copolymer is prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch, and the foaming agent includes at least one selected from the group consisting of $C_2$ to $C_7$ aliphatic hydrocarbon, $C_2$ to $C_7$ halogenated hydrocarbon, and carbon dioxide.

In addition, the present invention provides a method for preparing expandable starch beads, in which the method includes preparing particulate pellets by mixing and extruding a starch-monomer copolymer and a resin; and including a foaming agent in the particulate pellets thus prepared; and the starch-monomer copolymer is prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch, the resin includes at least one selected from the group consisting of polystyrene, polyethylene, polypropylene, ethylenevinylacetate, polylactic acid, polycaprolactone, polybutylene succinate, polybutylene succinate adipate and polybutylene adipate terephthalate, and the foaming agent includes at least one selected from the group consisting of $C_2$ to $C_7$ aliphatic hydrocarbon, $C_2$ to $C_7$ halogenated hydrocarbon, and carbon dioxide.

Effect

The expandable starch beads according to the present invention can be foam-molded by equipment for foaming expandable polystyrene beads because the expandable starch beads have similar properties to the expandable polystyrene beads. Generally, in the case of foam-molding using equipment for foaming the expandable polystyrene beads, it is possible to prepare foams having various sizes and various shapes by a mold. On the other hand, in the case of foam-molding using foaming equipment including an extruder, a size and shape of foam are limited by a die included in front of the extruder, and generally, the foam in a type of peanut or sheet is only prepared. Therefore, the foams prepared from the expandable starch beads according to the present invention have advantages such that it can have various shapes like Styrofoam and also can be used for medium and large packing as well as small packing.

In addition, the foams prepared from the expandable starch beads according to the present invention have an advantage such that in the case of discarding, the foams are environmentally friendly foams, thereby being discomposed by soil microorganisms.

BEST MODE

Figure 1:
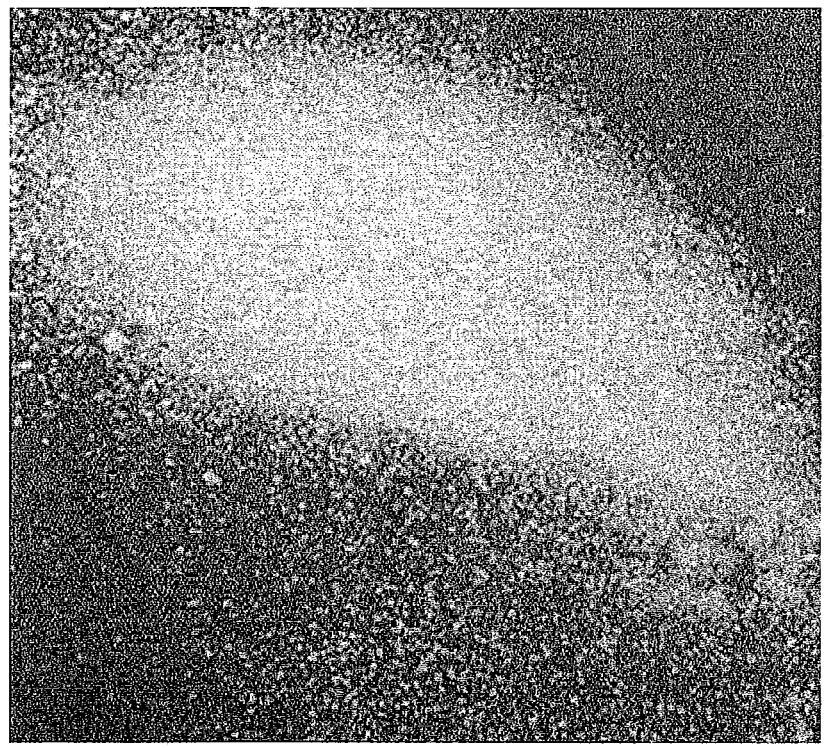
FIG. 1 is a photograph illustrating starch-styrene copolymers prepared in Preparation Example 10.

Hereinafter, the present invention will be described in detail.

The expandable starch beads according to an example of the present invention include a starch-monomer copolymer and a foaming agent impregnated in the starch-monomer copolymer.

The starch-monomer copolymer is prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch, and preferably, is a graft copolymer prepared by grafting a monomer to starch. The acrylic ester is preferably acrylic acid and ester of $C_1$ to $C_8$ alcohol, for example, methyl acrylate, ethyl acrylate, butyl acrylate, and the like. In addition, the methacrylic ester is preferably methacrylic acid and ester of $C_1$ to $C_8$ alcohol, for example, methyl methacrylate, ethyl methacrylate, butyl methacrylate, and the like. The starch constituting the starch-monomer copolymer may include at least one selected from the group consisting of corn starch, glutinous corn starch, tapioca starch, potato starch, sweet potato starch, wheat starch, rice starch, and modified starches thereof, but the present invention is not limited thereto. In addition, the modified starch may be selected from the group consisting of oxidized starch, acid-treated starch, ester starch, ether starch, cross-linked starch phosphate, and acetylated starch adipate.

A weight ratio of starch and a monomer that constitute the starch-monomer copolymer is not largely limited, and preferably in the range of 10:90 to 90:10.

The foaming agent is low boiling point volatile, and may include at least one selected from the group consisting of $C_2$ to $C_7$ aliphatic hydrocarbon, $C_2$ to $C_7$ halogenated hydrocarbon, and carbon dioxide. Examples of the $C_2$ to $C_7$ aliphatic hydrocarbon include propane, butane, isobutane, pentane, isopentane, neopentane, hexane, and the like. The expandable starch beads according to an example of the present invention, which is prepared by impregnating the foaming agent in the starch-monomer copolymer have similar properties to general expandable polystyrene beads.

The expandable starch beads according to an example of the present invention include preferably 90 parts to 99 parts by weight of a starch-monomer copolymer and 1 part to 10 parts by weight of a foaming agent. In addition, preferably, the expandable starch beads according to an example of the present invention may further include 0.1 parts to 10 parts by weight of an initiator and 0.1 parts to 10 parts by weight of a dispersing agent relative to 100 parts by weight of the total weight of starch and monomer constituting the starch-monomer copolymer. At this time, the initiator may preferably include at least one selected from the group consisting of potassium persulfate, ammonium persulfate, benzoyl peroxide, eerie ammonium nitrate, azobisisobutyronitrile, and stannous octoate, but the present invention is not limited thereto. In addition, there are limitations on a type of the dispersing agent, and for example, the dispersing agent may include an organic dispersing agent, an inorganic dispersing agent, and the like. Preferably, the dispersing agent may include at least one selected from the group consisting of polyvinyl alcohol, polyvinyl acetate, methylcellulose, hydroxyethylcellulose, polyvinyl pyrrolidone, tricalciumphosphate, calcium carbonate, talc, bentonite, and magnesium silicate.

A size of the expandable starch bead according to an example of the present invention mainly depends on a size of the starch-monomer copolymer in a type of particles. For example, the size may have a diameter of 0.1 to 5.0 mm, preferably 0.3 to 3.0 mm, but the present invention is not limited thereto.

A method for preparing expandable starch beads according to an example of the present invention includes preparing a starch-monomer copolymer; and impregnating a foaming agent in the starch-monomer copolymer thus prepared. At this time, the starch-monomer copolymer is prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch, and the foaming agent includes at least one selected from the group consisting of $C_2$ to $C_7$ aliphatic hydrocarbon, $C_2$ to $C_7$ halogenated hydrocarbon, and carbon dioxide.

For the method for preparing the expandable starch beads according to an example of the present invention, the preparing of the starch-monomer copolymer preferably includes adding starch and monomer in a weight ratio of 10:90 to 90:10 to a reactor; adding 0.1 parts to 10 parts by weight of an initiator, 0.1 parts to 10 parts by weight of a dispersing agent, and 100 parts to 2000 parts by weight of water relative to 100 parts by weight of the total weight of the starch and monomer; and then reacting the mixture at a temperature of greater than 30° C. to less than 150° C. for 1 to 10 hours. In addition, for the preparing of the starch-monomer copolymer, a reaction temperature is preferably 50 to 120° C., and a reaction time is preferably 3 to 8 hours. For the preparing of the starch-monomer copolymer, when the reaction temperature is 30° C. or less or the reaction time is less than 1 hour, the reaction hardly occurs at all. On the other hand, when the reaction temperature is 150° C. or higher, the copolymers are agglomerated each other to form lumps. For the preparing of the starch-monomer copolymer, the initiator may preferably include at least one selected from the group consisting of potassium persulfate, ammonium persulfate, benzoyl peroxide, eerie ammonium nitrate, azobisisobutyronitrile, and stannous octoate. In addition, for the preparing of the starch-monomer copolymer, the dispersing agent may preferably include at least one selected from the group consisting of polyvinyl alcohol, polyvinyl acetate, methylcellulose, hydroxyethylcellulose, polyvinyl pyrrolidone, tricalciumphosphate, calcium carbonate, talc, bentonite, and magnesium silicate. The dispersing agent plays a role in stably suspending starch in the preparing of the starch-monomer copolymer, and also in uniformly dispersing the starch-monomer copolymer in the impregnating of the foaming agent to be described below.

For the method for preparing the expandable starch beads according to an example of the present invention, the impregnating of the foaming agent includes preferably adding the foaming agent to be a weight ratio of the starch-monomer copolymer: the foaming agent of 90:10 to 99:1 in the reactor including the starch-monomer copolymer; and then reacting the mixture at a temperature of 30 to 150° C. for 1 to 10 hours to impregnate the foaming agent in the starch-monomer copolymer. In addition, for the impregnating of the foaming agent, a reaction temperature is preferably 50 to 120° C., and a reaction time is preferably 3 to 8 hours. For the impregnating of the foaming agent, when the reaction temperature is less than 30° C., there are fears that the content of the foaming agent may be inadequate. On the other hand, when the reaction temperature is higher than 150° C., the starch-monomer copolymers may be agglomerated each other to form lumps. In addition, the impregnating of the foaming agent is carried out under an inert gas atmosphere of about 5 to 20 kgf/cm$^2$, and preferably a nitrogen atmosphere of 8 to 15 kgf/cm$^2$.

The expandable starch beads according to other example of the present invention include particulate pellets formed by extruding a mixture of a starch-monomer copolymer and a resin, and a foaming agent impregnated in the particulate pellets. At this time, the starch-monomer copolymer is prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch. For the expandable starch beads according to other example of the present invention, the detail explanation about the starch-monomer copolymer will be not provided because it is the same as the previous explanation about the expandable starch beads according to an example of the present invention.

For the expandable starch beads according to other example of the present invention, the resin includes at least one selected from the group consisting of polystyrene, polyethylene, polypropylene, ethylenevinylacetate, polylactic acid, polycaprolactone, polybutylene succinate, polybutylene succinate adipate and polybutylene adipate terephthalate. In addition, for the expandable starch beads according to other example of the present invention, the foaming agent includes at least one selected from the group consisting of $C_2$ to $C_7$ aliphatic hydrocarbon, $C_2$ to $C_7$ halogenated hydrocarbon, and carbon dioxide.

For the expandable starch beads according to other example of the present invention, the particulate pellets include preferably 10 parts to 90 parts by weight of a starch-monomer copolymer and 10 parts to 90 parts by weight of a resin. Preferably, the particulate pellet has a diameter of 0.5 to 5.0 mm, and more preferably, a diameter of 1.0 to 3.0 mm. A size of the expandable starch bead according to other example of the present invention mainly depends on a size of particulate pellet largely.

In addition, the expandable starch beads according to other example of the present invention may preferably include 1 part to 10 parts by weight of a foaming agent relative to 100 parts by weight of particulate pellets, and more preferably, may further include 0.1 parts to 10 parts by weight of a dispersing agent relative to 100 parts by weight of particulate pellets. A type of the dispersing agent is not largely limited, and the dispersing agent may include preferably at least one selected from the group consisting of polyvinyl alcohol, polyvinyl acetate, methylcellulose, hydroxyethylcellulose, polyvinyl pyrrolidone, tricalciumphosphate, calcium carbonate, talc, bentonite, and magnesium silicate. Furthermore, the expandable starch beads according to other example of the present invention may further include a small amount of an initiator added in the starch-monomer copolymer.

A method for preparing expandable starch beads according to other example of the present invention includes preparing particulate pellets by mixing a starch-monomer copolymer and a resin and then extruding; and including a foaming agent to the particulate pellets thus prepared. At this time, the starch-monomer copolymer is prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch. In addition, the resin includes at least one selected from the group consisting of polystyrene, polyethylene, polypropylene, ethylenevinylacetate, polylactic acid, polycaprolactone, polybutylene succinate, polybutylene succinate adipate and polybutylene adipate terephthalate. In addition, the foaming agent includes at least one selected from the group consisting of $C_2$ to $C_7$ aliphatic hydrocarbon, $C_2$ to $C_7$ halogenated hydrocarbon, and carbon dioxide.

A method for preparing expandable starch beads according to other example of the present invention may further include preparing a starch-monomer copolymer before preparing particulate pellets. The detailed explanation about the preparing of the starch-monomer copolymer will be not provided because it is the same as the previous explanation in the method of preparing the expandable starch beads according to an example of the present invention.

For a method for preparing expandable starch beads according to other example of the present invention, a weight ratio of a starch-monomer copolymer: a resin in the preparing of the particulate pellets is preferably 10:90 to 90:10. The preparing of the particulate pellets may be carried out by a general extruder.

For a method for preparing expandable starch beads according to other example of the present invention, the impregnating of the particulate pellets includes preferably adding 1 part to 10 parts by weight of a foaming agent, 0.1 parts to 10 parts by weight of a dispersing agent, and 100 parts to 2000 parts by weight of water relative to 100 parts by weight of the particulate pellets thus prepared to a reactor; and then reacting the mixture at a temperature of 30 to 150° C. for 1 to 10 hours. In addition, in the impregnating of the particulate pellets, a reaction temperature is preferably 50 to 120° C., and a reaction time is preferably 3 to 8 hours. For the impregnating of the foaming agent to the particulate pellets, when the reaction temperature is less than 30° C., there are fears that the content of the foaming agent may be inadequate. On the other hand, when the reaction temperature is higher than 150° C., the particulate pellets may be agglomerated each other to form lumps. In addition, the impregnating of the foaming agent to the particulate pellets is carried out under an inert gas atmosphere of about 5 to 20 kgf/cm², and preferably a nitrogen atmosphere of 8 to 15 kgf/cm². At this time, the dispersing agent include preferably at least one selected from the group consisting of polyvinyl alcohol, polyvinyl acetate, methylcellulose, hydroxyethylcellulose, polyvinyl pyrrolidone, tricalciumphosphate, calcium carbonate, talc, bentonite, and magnesium silicate.

The expandable starch beads according to the present invention may be molded into foam by equipment of foaming general expandable polystyrene. A foam according to the present invention means a product prepared by foam-molding expandable starch beads, and for example includes molded products such as Styrofoam, film, sheet, three dimensional structure packing materials in various shapes, and the like. The present invention is not limited thereto. Anything will do as long as the foam is an expandable product. In addition, it is possible that the expandable starch beads according to the present invention can be foam-molded by all kinds of equipment capable of foaming process, as well as equipment for foaming general expandable polystyrene.

Hereinafter, the present invention will be described in more detail with reference to Examples. However, these Examples are only for clearly illustrating the present invention, and are not intended to limit the protection range of the present invention.

1. Preparation of Expandable Beads

Preparation Example 1

6 kg of corn starch, 6 kg of styrene, 30 kg of water, 0.06 kg of potassium persulfate, and 0.06 kg of tricalcium phosphate were added to a reactor, and reacted at a temperature of 60° C. for 6 hours to prepare a starch-styrene copolymer. Since then, 1 kg of pentane was added to the reactor, and reacted at a temperature of 100° C. under a nitrogen atmosphere of 10 kgf/cm² for 6 hours to impregnate the pentane to the starch-styrene copolymer. Since then, the reaction product was filtered and dried to obtain expandable starch beads.

Preparation Example 2

Expandable starch beads were obtained by using the same method as Preparation Example 1, except that 0.12 kg of potassium persulfate was used.

Preparation Example 3

Expandable starch beads were obtained by using the same method as Preparation Example 1, except that ammonium persulfate was used instead of potassium persulfate.

Preparation Example 4

Expandable starch beads were obtained by using the same method as Preparation Example 1, except that 9 kg of corn starch and 3 kg of styrene were used.

Preparation Example 5

Expandable starch beads were obtained by using the same method as Preparation Example 1, except that 3 kg of corn starch and 9 kg of styrene were used.

Preparation Example 6

Expandable starch beads were obtained by using the same method as Preparation Example 1, except that lactic acid and stannous octoate were used instead of styrene and potassium persulfate, respectively.

Preparation Example 7

6 kg of corn starch, 5.5 kg of styrene, 0.5 kg of acrylic acid, 30 kg of water, 0.06 kg of potassium persulfate, and 0.06 kg of tricalcium phosphate were added to a reactor, and reacted at a temperature of 60° C. for 6 hours to prepare a starch-monomer (styrene, acrylic acid) copolymer. Since then, 1 kg of pentane was added to the reactor, and reacted at a temperature of 100° C. under a nitrogen atmosphere of 10 kgf/cm² for 6 hours to impregnate the pentane to the starch-monomer copolymer. Since then, the reaction product was filtered and dried to obtain expandable starch beads.

Preparation Example 8

Expandable starch beads were obtained by using the same method as Preparation Example 1, except that tapioca starch was used instead of corn starch.

Preparation Example 9

Expandable starch beads were obtained by using the same method as Preparation Example 1, except that butane was used instead of pentane.

Preparation Example 10

Figure 2:
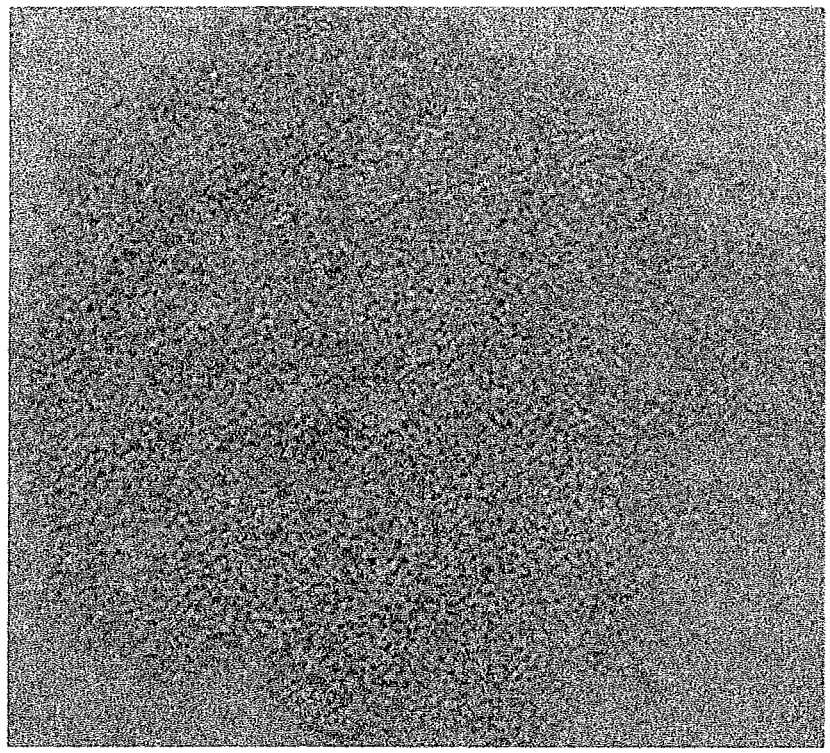
FIG. 2 is a photograph illustrating particulate pellets prepared by using an extruder in Preparation Example 10.
Figure 3:
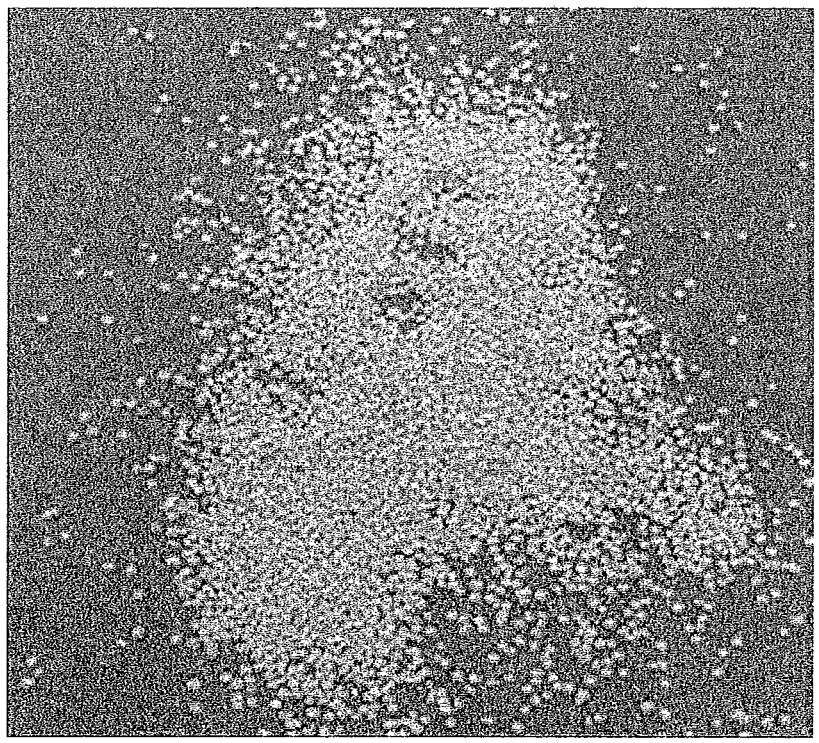
FIG. 3 is a photograph illustrating expandable starch beads obtained in Preparation Example 10.

6 kg of corn starch, 6 kg of styrene, 30 kg of water, 0.06 kg of potassium persulfate, and 0.06 kg of tricalcium phosphate were added to a reactor, and reacted at a temperature of 60° C. for 6 hours to prepare a starch-styrene copolymer. Since then, the starch-styrene copolymer was filtered while being washed with water, and dried in a hot-air drying machine at 100° C. FIG. 1 is a photograph illustrating a starch-styrene copolymer prepared in Preparation Example 10. A mixture mixed with 6 kg of the dried starch-styrene copolymer and 6 kg of polystyrene was passed through an extruder to prepare particulate pellets. FIG. 2 is a photograph illustrating the particulate pellets prepared by using the extruder in Preparation Example 10. Since then, 10 kg of the particulate pellets thus prepared, 0.06 kg of polyvinyl alcohol, 30 kg of water, and 1 kg of pentane were added to the reactor, and reacted at a temperature of 100° C. under a nitrogen atmosphere of 10 kgf/cm² for 8 hours to impregnate the pentane to the particulate pellets. Since then, the reaction product was filtered and dried at 30° C. to obtain expandable starch beads. FIG. 3 is a photograph illustrating the expandable starch beads obtained in Preparation Example 10.

Preparation Example 11

Expandable starch beads were obtained by using the same method as Preparation Example 10, except that 0.12 kg of potassium persulfate was used.

Preparation Example 12

Expandable starch beads were obtained by using the same method as Preparation Example 10, except that ammonium persulfate was used instead of potassium persulfate.

Preparation Example 13

Expandable starch beads were obtained by using the same method as Preparation Example 10, except that 9 kg of corn starch and 3 kg of styrene were used.

Preparation Example 14

Expandable starch beads were obtained by using the same method as Preparation Example 10, except that 3 kg of corn starch and 9 kg of styrene were used.

Preparation Example 15

Expandable starch beads were obtained by using the same method as Preparation Example 10, except that lactic acid and stannous octoate were used instead of styrene and potassium persulfate, respectively.

Preparation Example 16

6 kg of corn starch, 5.5 kg of styrene, 0.5 kg of acrylic acid, 30 kg of water, 0.06 kg of potassium persulfate, and 0.06 kg of tricalcium phosphate were added to a reactor, and reacted at a temperature of 60° C. for 6 hours to prepare a starch-monomer (styrene, acrylic acid) copolymer. Since then, the starch-monomer copolymer was filtered while being washed with water, and dried in a hot-air drying machine at 100° C. A mixture mixed with 6 kg of the dried starch-monomer copolymer and 6 kg of polystyrene was passed through an extruder to prepare particulate pellets. Since then, 10 kg of the particulate pellets thus prepared, 0.06 kg of methyl cellulose, 30 kg of water, and 1 kg of pentane were added to the reactor, and reacted at a temperature of 100° C. under a nitrogen atmosphere of 10 kgf/cm$^2$ for 8 hours to impregnate the pentane to the particulate pellets. Since then, the reaction product was filtered and dried at 30° C. to obtain expandable starch beads.

Preparation Example 17

Expandable starch beads were obtained by using the same method as Preparation Example 10, except that tapioca starch was used instead of corn starch.

Preparation Example 18

Expandable starch beads were obtained by using the same method as Preparation Example 10, except that butane was used instead of pentane.

Comparative Preparation Example 1

6 kg of corn starch, 6 kg of styrene, 30 kg of water, 0.06 kg of potassium persulfate, and 0.06 kg of tricalcium phosphate were added to a reactor, and reacted at a temperature of 30° C. for 6 hours to prepare a starch-monomer copolymer. Since then, the starch-monomer copolymer was filtered while being washed with water, and dried in a hot-air drying machine at 60° C. 6 kg of the dried starch-monomer copolymer, 0.06 kg of polyvinyl alcohol, 20 kg of water, and 1 kg of pentane were added to the reactor, and reacted at a temperature of 100° C. under a nitrogen atmosphere of 10 kgf/cm$^2$ for 8 hours. At this time, the dried starch-monomer copolymer was gelatinized, and thereby expandable starch beads were not formed.

Comparative Preparation Example 2

6 kg of corn starch, 6 kg of styrene, 30 kg of water, 0.06 kg of potassium persulfate, and 0.06 kg of tricalcium phosphate were added to a reactor, and reacted at a temperature of 60° C. for 50 minutes to prepare a starch-monomer copolymer. Since then, the starch-monomer copolymer was filtered while being washed with water, and dried in a hot-air drying machine at 60° C. 6 kg of the dried starch-monomer copolymer, 0.06 kg of polyvinyl alcohol, 20 kg of water, and 1 kg of pentane were added to the reactor, and reacted at a temperature of 100° C. under a nitrogen atmosphere of 10 kgf/cm$^2$ for 8 hours. At this time, the dried starch-monomer copolymer was gelatinized, and thereby expandable starch beads were not formed.

Comparative Preparation Example 3

6 kg of corn starch, 6 kg of styrene, 30 kg of water, 0.06 kg of potassium persulfate, and 0.06 kg of tricalcium phosphate were added to a reactor, and reacted at a temperature of 150° C. for 6 hours to prepare a starch-monomer copolymer. At this time, since the starch-monomer copolymers were agglomerated each other to form lumps, the subsequent process for impregnating a foaming agent was not carried out.

Comparative Preparation Example 4

6 kg of corn starch, 0.06 kg of polyvinyl alcohol, 20 kg of water, and 1 kg of pentane were added to a reactor, and reacted at a temperature of 100° C. under a nitrogen atmosphere of 10 kgf/cm$^2$ for 8 hours. At this time, since the corn starch was gelatinized, the expandable starch beads were not formed.

Comparative Preparation Example 5

10 kg of corn starch, 0.3 kg of kaolin powder, 0.6 kg of polyvinyl acetate, 0.5 kg of glucose, 0.08 kg of potassium carbonate, 0.5 kg of styrene, and 0.06 kg of potassium persulfate were added to a mixer, mixed, and then water was further added to the mixer. Since then, the content of water was adjusted to 20% to prepare a starch-based composition. The starch-based composition was added to an extruder, extruded, and then made to be pellets. Since then, the pellets were rehydrated to obtain expandable starch beads with the water content of 20%. At this time, water functioned as a foaming agent.

Comparative Preparation Example 6

A mixture mixed with 6 kg of corn starch and 6 kg of polystyrene were passed through an extruder to prepare particulate pellets. Since then, 10 kg of the prepared particulate pellets, 0.06 kg of polyvinyl alcohol, 30 kg of water, and 1 kg of pentane were added to a reactor, and reacted at a temperature of 100° C. under a nitrogen atmosphere of 10 kgf/cm$^2$ for 8 hours to impregnate the pentane in the particulate pellets. At this time, a great amount of corn starch constituting the particulate pellets was separated from polystyrene. Since then, the reaction product was filtered, and dried at 30° C. to obtain expandable starch beads.

Comparative Preparation Example 7

12 kg of styrene, 30 kg of water, 0.06 kg of benzoyl peroxide, and 0.12 kg of tricalcium phosphate were added to a reactor, and reacted at a temperature of 80° C. for 6 hours to prepare polystyrene. Since then, 1 kg of pentane was added to the reactor, and reacted at a temperature of 100° C. under a nitrogen atmosphere of 10 kgf/cm$^2$ for 6 hours to impregnate the pentane in the polystyrene. Since then, the reaction product was filtered, and dried to obtain expandable polystyrene beads.

2. Rate of Copolymerization for Starch-Monomer Copolymer and Foaming Agent Content in Expandable Bead (1) Rate of Copolymerization for Copolymer Rates of copolymerization for the prepared starch-monomer copolymers in the processes of obtaining expandable beads in Preparation Examples 1 to 9 and Comparative Preparation Examples 1 and 2 were analyzed. For the starch-monomer copolymers prepared in Preparation Examples 10 to 18, the rates of copolymerization were the same as the rates of copolymerization for the starch-monomer copolymers prepared in Preparation Examples 1 to 9, respectively. Specifically, monomers or polymers of monomers, that were not copolymerized, were extracted from the starch-monomer copolymers by using a soxhlet device (solvent: toluene; 100° C.; 24 hours), and then the rate of copolymerization was calculated by the following Equation:

$$G(\text{Rate of Copolymerization } \%) = \frac{W_1 - W_0}{W_1} \times 100$$

(Here, $W_1$ represents the amount of a starch-monomer copolymer; and $W_0$ represents the amount of starch added).

The rates of copolymerization for the starch-monomer copolymers calculated by the above Equation are listed in the following Table 1.

TABLE 1

| Preparation Example | G (Rate of Copolymerization, %) |
| --- | --- |
| Preparation Example 1 | 25 |
| Preparation Example 2 | 26 |
| Preparation Example 3 | 20 |
| Preparation Example 4 | 15 |
| Preparation Example 5 | 12 |
| Preparation Example 6 | 15 |
| Preparation Example 7 | 28 |
| Preparation Example 8 | 24 |
| Preparation Example 9 | 22 |
| Com. Preparation Example 1 | 0 |
| Com. Preparation Example 2 | 0 |

As shown in Table 1, when a reaction temperature was 30° C. or less or a reaction time was 50 minutes or less at the time of preparing the starch-monomer copolymers, the copolymers were not produced. In addition, when the reaction temperature was 150° C. or higher, the copolymers were agglomerated each other to form lumps, so that it was difficult to produce the expandable starch beads.

(2) Foaming Agent Content in Expandable Beads

The contents of the foaming agent in the expandable beads prepared in Preparation Examples 1 to 18 and Comparative Preparation Examples 6 and 7 were measured by using a gas chromatograph. The results are listed in Table 2.

TABLE 2

| Preparation Example | Content of Foaming Agent (%) |
| --- | --- |
| Preparation Example 1 | 3.9 |
| Preparation Example 2 | 3.6 |
| Preparation Example 3 | 3.2 |
| Preparation Example 4 | 3.4 |
| Preparation Example 5 | 3.1 |
| Preparation Example 6 | 3.4 |
| Preparation Example 7 | 4.5 |
| Preparation Example 8 | 3.8 |
| Preparation Example 9 | 3.2 |
| Preparation Example 10 | 3.0 |
| Preparation Example 11 | 3.0 |
| Preparation Example 12 | 2.9 |
| Preparation Example 13 | 3.1 |
| Preparation Example 14 | 2.9 |
| Preparation Example 15 | 3.0 |
| Preparation Example 16 | 3.6 |
| Preparation Example 17 | 3.1 |
| Preparation Example 18 | 2.9 |
| Com. Preparation Example 6 | 1.0 |
| Com. Preparation Example 7 | 4.8 |

As shown in Comparative Preparation Example 6 of Table 2, when a foaming agent was impregnated in particulate pellets formed by extruding a mixture of general corn starch and polystyrene, the content of the foaming agent was very low.

3. Preparation of Foam from Expandable Beads

Test Example 1

Figure 4:
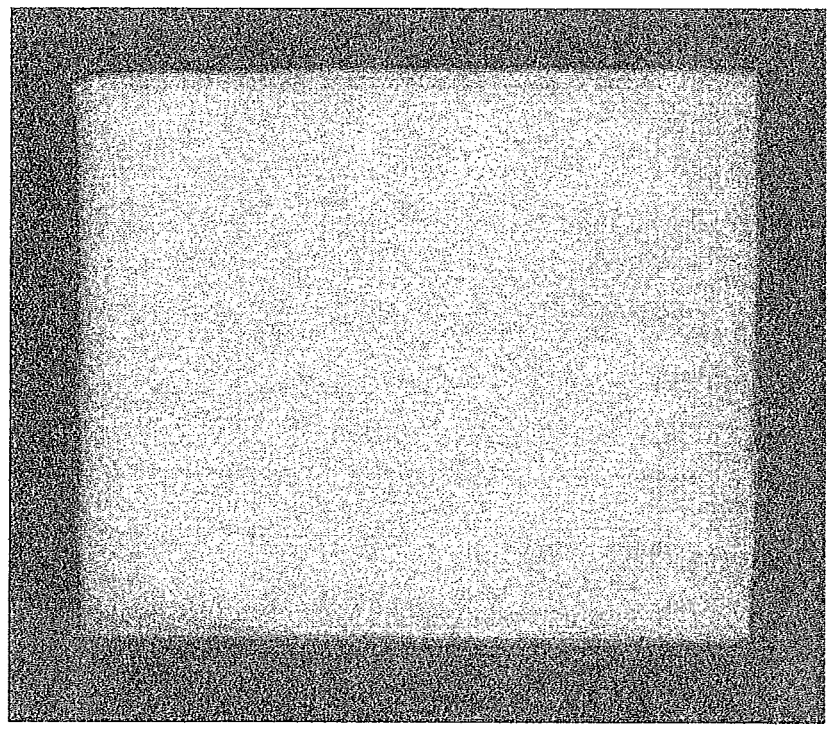
FIG. 4 is a photograph illustrating foam in a type of plate prepared in Test Example 1.

The expandable starch beads obtained from Preparation Example 1 were added to a mold in a type of plate installed in equipment for foaming expandable polystyrene beads; steam was supplied to the mold; and then foam-molded to prepare foam. FIG. 4 is a photograph illustrating foam in a type of plate prepared in Test Example 1.

Test Example 2

Foam was prepared by using the same method as Test Example 1, except that the expandable starch beads obtained from Preparation Example 2 were used.

Test Example 3

Foam was prepared by using the same method as Test Example 1, except that the expandable starch beads obtained from Preparation Example 3 were used.

Test Example 4

Foam was prepared by using the same method as Test Example 1, except that the expandable starch beads obtained from Preparation Example 6 were used.

Test Example 5

Foam was prepared by using the same method as Test Example 1, except that the expandable starch beads obtained from Preparation Example 7 were used.

Test Example 6

Foam was prepared by using the same method as Test Example 1, except that the expandable starch beads obtained from Preparation Example 8 were used.

Test Example 7

Foam was prepared by using the same method as Test Example 1, except that the expandable starch beads obtained from Preparation Example 10 were used.

Test Example 8

Foam was prepared by using the same method as Test Example 1, except that the expandable starch beads obtained from Preparation Example 16 were used.

Test Example 9

Foam was prepared by using the same method as Test Example 1, except that the expandable starch beads obtained from Preparation Example 17 were used.

Test Example 10

Figure 5:
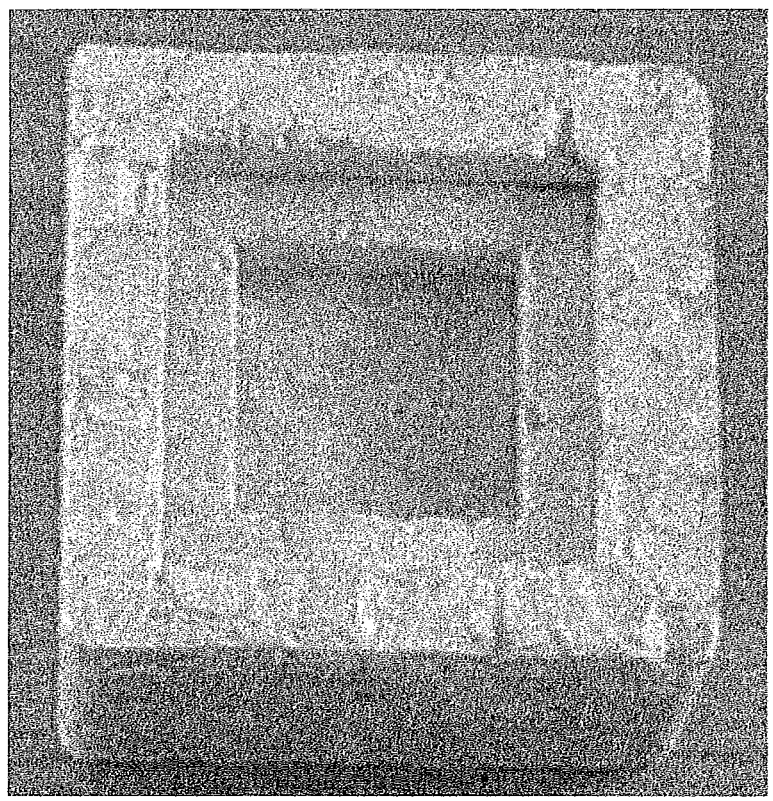
FIG. 5 is a photograph illustrating foam in a type of square box container prepared in Test Example 10.

The expandable starch beads obtained from Preparation Example 10 were added to a mold in a type of square box container installed in equipment for foaming expandable polystyrene beads; steam was supplied to the mold; and then foam-molded to prepare foam. FIG. 5 is a photograph illustrating foam in a type of square box container prepared in Test Example 10.

Comparative Test Example 1

Foam was prepared by using the same method as Test Example 1, except that the expandable starch beads obtained from Comparative Preparation Example 5 were used. At this time, there was almost no foam.

Comparative Test Example 2

Figure 6:
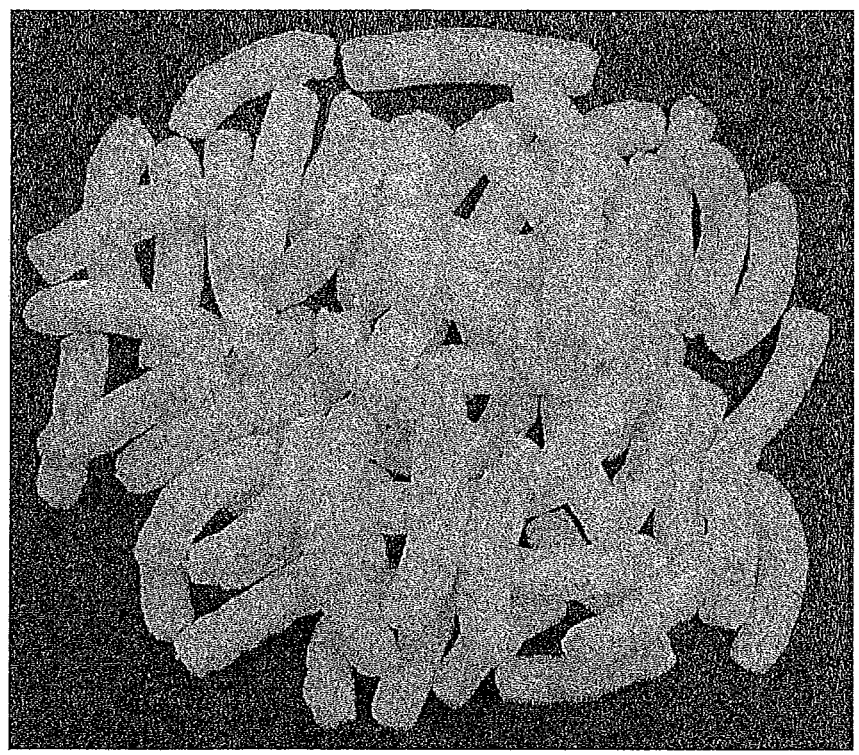
FIG. 6 is a photograph illustrating foams in a type of peanut prepared in Comparative Experimental Example 2.

The expandable starch beads prepared in Comparative Preparation Example 5 were added to foaming equipment in a type of extruder with a screw diameter of 55 mm and L/D of 7, and then foamed at operation conditions of screw rate of 75 rpm and barrel temperature of 220° C. to prepare foam. At this time, a die of the extruder had a circular shape. FIG. 6 is a photograph illustrating foam in a type of peanut prepared in Comparative Test Example 2.

Comparative Test Example 3

Foam was prepared by using the same method as Test Example 1, except that the expandable starch beads obtained from Comparative Preparation Example 6 were used.

Comparative Test Example 4

Figure 7:
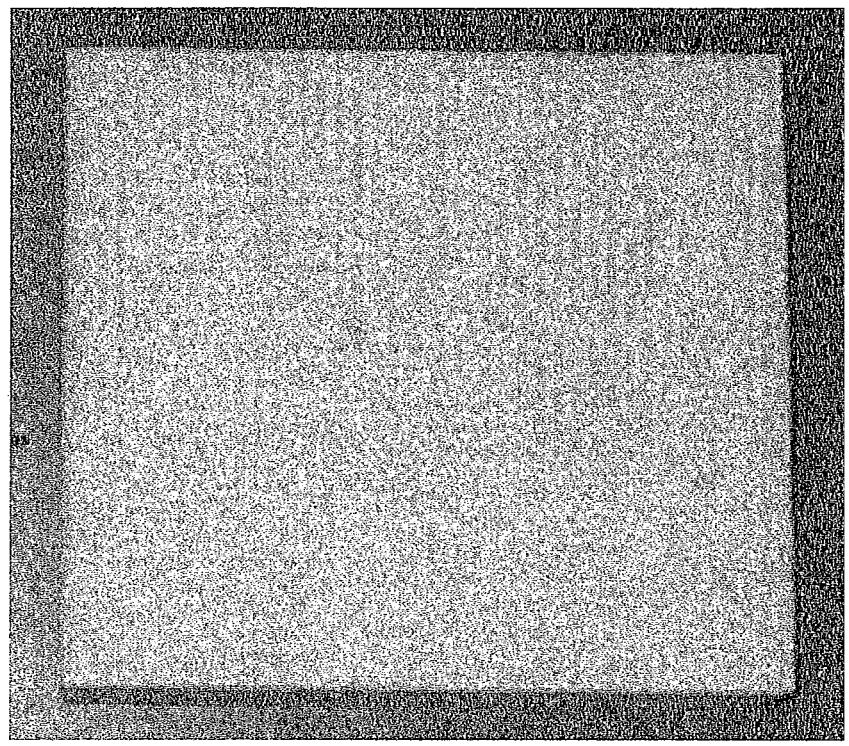
FIG. 7 is a photograph illustrating foam in a type of plate prepared in Comparative Test Example 4.

Foam was prepared by using the same method as Test Example 1, except that the expandable starch beads obtained from Comparative Preparation Example 7 were used. FIG. 7 is a photograph illustrating foam in a type of plate prepared in Comparative Test Example 4.

4. Physical Properties of Foam prepared from Expandable Beads (1) Apparent Density of Foam and Rate of Foaming Converted From Apparent Density As an apparent density of foam, a volume and weight of the foam were measured, and then calculated by using the following Equation:

$$\text{Apparent Density (kg/m}^3\text{)} = \frac{\text{Weight of Test Sample (kg)}}{\text{Volume of Test Sample (m}^3\text{)}}$$

In addition, a rate of foaming of the foam (Comparative Test Example 4) prepared from expandable polystyrene beads was defined as 100, and then the relative rates of foaming for the rest foams were calculated based on the above rate. A rate of foaming is in inverse proportion to an apparent density of foam.

(2) Measurement of Compression strength for Foam

Compression strength for foam was measured by using an Instron device, and specifically, the compression strength was measured when the foam was deformed by 10%.

$$\text{Compression Strength (kg/cm}^2\text{)} = \frac{\text{Load at the time of deforming 10\%(kg)}}{\text{Cross Section (cm}^2\text{)}}$$

Table 3 shows the results of measuring apparent densities, relative rates of foaming, and compression strengths in the foams prepared Test Examples and Comparative Test Examples.

TABLE 3

| Test Example | Apparent Density (kg/m$^a$) | Relative Rate of Foaming (Based on Foam of Com. Test Example 4) | Compression Strength (kg/cm$^2$) |
|---|---|---|---|
| Test Example 1 | 17 | 100.0 | 0.9 |
| Test Example 2 | 18 | 94.4 | 0.9 |
| Test Example 3 | 20 | 85.0 | 1.0 |
| Test Example 4 | 18 | 94.4 | 0.9 |
| Test Example 5 | 15 | 113.3 | 0.8 |
| Test Example 6 | 17 | 100.0 | 0.8 |
| Test Example 7 | 22 | 77.3 | 1.2 |
| Test Example 8 | 24 | 70.8 | 1.3 |
| Test Example 9 | 21 | 81.0 | 1.2 |
| Test Example 10 | 22 | 77.3 | 1.2 |
| Com. Test Example 1 | 35 | 48.6 | 2.1 |
| Com. Test Example 2 | 10 | 170.0 | 0.6 |
| Com. Test Example 3 | 29 | 58.6 | 1.8 |
| Com. Test Example 4 | 17 | Standard (100) | 1.1 |

As shown in Table 3, it can be found that the foams prepared from the expandable starch beads according to the present invention have the similar rates of foaming and mechanical strength as the foams prepared from the expandable polystyrene beads.

As described above, the present invention has been described with reference to Examples, but the present invention is not limited thereto. Various modifications are possible within the scope and spirit of the present invention. Therefore, it should be understood that the protective range of the present invention is not limited to the specific embodiments, but all the embodiments belonging to the claims attached in the present invention can be included.

The invention claimed is:

1. Expandable starch beads, comprising a starch-monomer copolymer and a foaming agent impregnated in the starch-monomer copolymer,
    the starch-monomer copolymer being prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch, and the foaming agent including at least one selected from the group consisting of $C_2$ to $C_7$ aliphatic hydrocarbon, $C_2$ to $C_7$ halogenated hydrocarbon, and carbon dioxide.

2. The expandable starch beads according to claim 1, wherein a weight ratio of starch to a monomer constituting the starch-monomer copolymer is 10:90 to 90:10.

3. The expandable starch beads according to claim 1, wherein the expandable starch beads include 90 parts to 99 parts by weight of the starch-monomer copolymer and 1 part to 10 parts by weight of the foaming agent.

4. The expandable starch beads according to claim 1, wherein the expandable starch beads further include 0.1 parts to 10 parts by weight of an initiator and 0.1 parts to 10 parts by weight of a dispersing agent relative to 100 parts by weight of the total weight of the starch and monomer.

5. The expandable starch beads according to claim 4, wherein the initiator includes at least one selected from the group consisting of potassium persulfate, ammonium persulfate, benzoyl peroxide, eerie ammonium nitrate, azobisisobutyronitrile, and stannous octoate, and the dispersing agent includes at least one selected from the group consisting of polyvinyl alcohol, polyvinyl acetate, methylcellulose, hydroxyethylcellulose, polyvinyl pyrrolidone, tricalciumphosphate, calcium carbonate, talc, bentonite, and magnesium silicate.

6. Expandable starch beads comprising particulate pellets formed by extruding a mixture of a starch-monomer copolymer and a resin, and a foaming agent impregnated in the particulate pellets, the starch-monomer copolymer being prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch, the resin including at least one selected from the group consisting of polystyrene, polyethylene, polypropylene, ethylenevinylacetate, polylactic acid, polycaprolactone, polybutylene succinate, polybutylene succinate adipate and polybutylene adipate terephthalate, and the foaming agent including at least one selected from the group consisting of $C_2$ to $C_7$ aliphatic hydrocarbon, $C_2$ to $C_7$ halogenated hydrocarbon, and carbon dioxide.

7. The expandable starch beads according to claim 6, wherein the particulate pellets includes 10 parts to 90 parts by weight of the starch-monomer copolymer and 10 parts to 90 parts by weight of the resin, and the expandable starch beads include 1 part to 10 parts by weight of the foaming agent relative to 100 parts by weight of the particulate pellets.

8. The expandable starch beads according to claim 7, wherein the particulate pellet has a diameter of 0.5 to 5.0 mm.

9. The expandable starch beads according to claim 6, wherein the expandable starch beads further include 0.1 parts to 10 parts by weight of a dispersing agent relative to 100 parts by weight of the particulate pellets.

10. The expandable starch beads according to claim 9, wherein the dispersing agent includes at least one selected from the group consisting of polyvinyl alcohol, polyvinyl acetate, methylcellulose, hydroxyethylcellulose, polyvinyl pyrrolidone, tricalciumphosphate, calcium carbonate, talc, bentonite, and magnesium silicate.

11. A method for preparing expandable starch beads, the method comprising:

preparing a starch-monomer copolymer; and impregnating a foaming agent in the prepared starch-monomer copolymer;

the starch-monomer copolymer being prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch, and the foaming agent including at least one selected from the group consisting of $C_2$ to $C_7$ aliphatic hydrocarbon, $C_2$ to $C_7$ halogenated hydrocarbon, and carbon dioxide.

12. The method for preparing the expandable starch beads according to claim 11, wherein the preparing of the starch-monomer copolymer includes adding the starch and monomer in a weight ratio of 10:90 to 90:10 to a reactor; adding 0.1 parts to 10 parts by weight of an initiator, 0.1 parts to 10 parts by weight of a dispersing agent, and 100 parts to 2000 parts by weight of water relative to 100 parts by weight of the total weight of the starch and monomer to the reactor; and then reacting the mixture at a temperature of higher than 30° C. to less than 150° C. for 1 to 10 hours.

13. The method for preparing the expandable starch beads according to claim 11, wherein the impregnating of the foaming agent includes adding the foaming agent to the reactor including the starch-monomer copolymer to be a weight ratio of the starch-monomer copolymer:the foaming agent of 90:10 to 99:1; and reacting the mixture at a temperature of 30° C. to 150° C. for 1 to 10 hours to impregnate the foaming agent in the starch-monomer copolymer.

14. The method for preparing the expandable starch beads according to claim 12, wherein the initiator includes at least one selected from the group consisting of potassium persulfate, ammonium persulfate, benzoyl peroxide, ceric ammonium nitrate, azobisisobutyronitrile, and stannous octoate.

15. The method for preparing the expandable starch beads according to claim 12, wherein the dispersing agent includes at least one selected from the group consisting of polyvinyl alcohol, polyvinyl acetate, methylcellulose, hydroxyethylcellulose, polyvinyl pyrrolidone, tricalciumphosphate, calcium carbonate, talc, bentonite, and magnesium silicate.

16. A method for preparing expandable starch beads, the method comprising:

preparing particulate pellets by mixing a starch-monomer copolymer and a resin, and extruding; and impregnating a foaming agent in the prepared particulate pellets;

the starch-monomer copolymer being prepared by bonding at least one monomer selected from the group consisting of styrene, α-methylstyrene, lactide, lactic acid, acrylic acid, methacrylic acid, acrylic ester, methacrylic ester, acrylonitrile, acrylamide, and caprolactone to starch, the resin including at least one selected from the group consisting of polystyrene, polyethylene, polypropylene, ethylenevinylacetate, polylactic acid, polycaprolactone, polybutylene succinate, polybutylene succinate adipate and polybutylene adipate terephthalate, and the foaming agent including at least one selected from the group consisting of $C_2$ to $C_7$ aliphatic hydrocarbon, $C_2$ to $C_7$ halogenated hydrocarbon, and carbon dioxide.

17. The method for preparing the expandable starch beads according to claim 16, wherein a weight ratio of the starch-monomer copolymer:the resin in the preparing of the particulate pellets is 10:90 to 90:10.

18. The method for preparing the expandable starch beads according to claim 16, wherein a weight ratio of a starch:monomer constituting the starch-monomer copolymer is 10:90 to 90:10.

19. The method for preparing the expandable starch beads according to claim 16, wherein the impregnating of the foaming agent in the particulate pellets includes adding 1 part to 10 parts by weight of the foaming agent, 0.1 parts to 10 parts by weight of a dispersing agent, and 100 parts to 2000 parts by weight of water relative to 100 parts by weight of the prepared particulate pellets to a reactor; and reacting the mixture at a temperature of 30° C. to 150° C. for 1 to 10 hours.

20. The method for preparing the expandable starch beads according to claim 19, wherein the dispersing agent includes at least one selected from the group consisting of polyvinyl alcohol, polyvinyl acetate, methylcellulose, hydroxyethylcellulose, polyvinyl pyrrolidone, tricalciumphosphate, calcium carbonate, talc, bentonite, and magnesium silicate.

\* \* \* \* \*